US012388588B1

(12) United States Patent
Sharma (10) Patent No.: US 12,388,588 B1
(45) Date of Patent: Aug. 12, 2025

(54) RESTRUCTURING STRUCTURED PAYLOADS FOR EFFICIENT DOWNSTREAM ELECTRONIC TRANSMISSION, STORAGE, AND PROCESSING

(71) Applicant: Briza, Inc., Austin, TX (US)

(72) Inventor: Rishi Sharma, Austin, TX (US)

(73) Assignee: Briza, Inc., Austin, TX (US)

( * ) Notice: Subject to any disclaimer, the term of this patent is extended or adjusted under 35 U.S.C. 154(b) by 0 days.

(21) Appl. No.: 19/049,840

(22) Filed: Feb. 10, 2025

Related U.S. Application Data (60) Provisional application No. 63/552,358, filed on Feb. 12, 2024.

(51) Int. Cl.
*H04L 5/00* (2006.01)
*G06F 9/54* (2006.01)

(52) U.S. Cl.
CPC ............ *H04L 5/0044* (2013.01); *G06F 9/546* (2013.01); *H04L 5/0058* (2013.01)

(58) Field of Classification Search
CPC ...... H04L 5/0044; H04L 5/0058; G06F 9/546
See application file for complete search history.

(56) References Cited

U.S. PATENT DOCUMENTS

| | | | |
|---|---|---|---|
| 2020/0341951 A1* | 10/2020 | Oberhofer | H04L 9/50 |
| 2021/0149898 A1* | 5/2021 | Mueller | G06F 16/24573 |
| 2024/0111745 A1* | 4/2024 | Wendel, III | G06F 16/24558 |
| 2025/0087327 A1* | 3/2025 | Hermey | G16H 50/20 |

OTHER PUBLICATIONS

Stack Overflow website thread; "Representing logic as data in JSON"; https://stackoverflow.com/questions/20737045/representing-logic-as-data-in-json; last published Feb. 19, 2023; last retrieved Feb. 10, 2025.
JSON Schema "JSON Schema: A Media Type for Describing JSON Documents"; https://json-schema.org/draft/2020-12/json-schema-core; published Jun. 16, 2022; last retrieved Feb. 10, 2025.

* cited by examiner

*Primary Examiner* — Syed Ali
*Assistant Examiner* — Najeeb Ansari
(74) *Attorney, Agent, or Firm* — Dickinson Wright LLP; Matthew D. Powell (57) ABSTRACT

Disclosed herein is a computer system and method for restructuring a structured payload for efficient downstream storage, transmission, and processing, in which a schema specifies fields including at least one contingently-required field. At least one processor is configured to: retrieve the schema and the structured payload from processor-readable memory; evaluate, for each contingently-required field in the schema, whether a respective condition in the schema is either satisfied or unsatisfied by content in the structured payload; responsive to a respective condition being satisfied, add the contingently-required field to a list of required fields; responsive to a respective condition being unsatisfied, add the contingently-required field to a list of removed fields; and generate a restructured payload by: adding to the structured payload all fields in the list of required fields that are missing; and removing from the structured payload all fields in the list of removed fields that are present.

17 Claims, 4 Drawing Sheets

FIG. 1A

Selected class of business: Manufacturer sales representative (42512000_41401200_00000000) Product:GL State:AL

REQUEST PAYLOAD    SUBMISSION

Select a node...

```
▼ AgentInfo {2}
    AgencyName : Test
    ▼ Person {2}
        ▼ Name {2}
            FirstName : John
            LastName : Snow
        ▼ CommunicationsInfo {2}
            ▼ PhoneInfo {1}
                PhoneNumber : 1111111111
            ▼ EmailInfo {1}
                EmailAddr : not-real@briza.com
▼ BusinessInfo {5}
    CommercialName : Hhhhh Test 1704822052840
    BusinessOwnershipStructure : Limited Liability Company
    ClassOfBusinessCd : 42512000_41401200_00000000
    ▼ Person {2}
        ▼ Name {2}
            FirstName : Otter
            LastName : Poker
        ▼ CommunicationsInfo {2}
            ▼ PhoneInfo {1}
                PhoneNumber : 1111111111
            ▼ EmailInfo {1}
                EmailAddr : not-real@briza.com
    ▼ MailingAddress {1}
        ▼ AddressInfo {2}
            Addr1 : 123 Main Street West
            City : Hartselle
            StateOrProvCd : [AL ▾]
            PostalCode : 35640
            County : [value]
▼ ProductQuoteRqs {2}
    ▼ ApplicationRatingInfo {7}
        ▼ ForbiddenProjectsMSR {11}
            AlcoholTobaccoElectronicCigaretteOrVaporProductsOrSupplies : [No ▾]
            AutoBoatOrUtilityVehiclesOrParts : [No ▾]
            ChemicalsOrChemicalSupplies : [No ▾]
            FarmingOrGardeningSupplies : [No ▾]
            GunFirearmOrAmmunitionProductsOrSupplies : [No ▾]
            PharmaceuticalOrMedicalDevices : [No ▾]
            HazardousMaterials : [No ▾]
            HealthFoodHerbsVitaminsOrSupplements : [No ▾]
            HerbicidesOrPesticides : [No ▾]
            PetOrPetSupplies : [No ▾]
            NoneOftheAbove : [Yes ▾]
        MSRBranchesOPS : [Yes ▾]
        MSRIndpntCtrctr : [Yes ▾]
```

[QUOTE]

RESTRUCTURING STRUCTURED PAYLOADS FOR EFFICIENT DOWNSTREAM ELECTRONIC TRANSMISSION, STORAGE, AND PROCESSING

CROSS-REFERENCE TO RELATED APPLICATION

This application claims priority to U.S. Provisional Patent Application Ser. No. 63/552,358 filed on Feb. 12, 2024 entitled "AUTOMATED DISCOVERY OF VALID PAYLOADS TO APPLICATION PROGRAMMING INTERFACES WHOSE ALLOWABLE OUTPUT VARIES BASED ON RELATIONSHIPS OF ATTRIBUTES WITHIN THE PAYLOAD", the contents of which are incorporated herein by reference.

FIELD

The following relates generally to electronic transmission, storage, and processing of payloads, and more particularly to computer systems and methods that restructure structured payloads for efficient downstream transmission, storage, and processing thereof.

BACKGROUND

Electronic communications between separately-owned or separately-developed systems or software components that participate in the implementation of an overall system for facilitating transactions between system participants, may be conducted using application programming interfaces (APIs). An API is a software interface presented by a given software component of a system as the interface by which that software component can receive electronic communications from another software component or other system, such as a request or an instruction, and can output electronic communications to a requesting software component, such as a response to a request or a confirmation of some task execution. An API is defined in terms of how other software components are to structure requests for information or tasks that are to be requested of a software component, and how responses to such requests by the implementing software component will be structured by the software component. Documentation for an API specifies what functionality and/or information the software component offers, and how other software components should format requests in order to elicit expected results.

An API may specify that requests be structured according to a particular protocol, such as: SOAP (Simple Object Access Protocol), RPC (Remote Procedure Call), REST (Representational State Transfer) API, Websocket API, or some other protocol structure. A request may include a payload that is a simple value such as a number or a text string or an array. A payload may be structured or semi-structured (for the purposes herein, referred to collectively as structured) using XML (eXtensible Markup Language) or another appropriate structuring format that includes markup tags used to specify names and types of fields, as well as their values, in the payload. For example, JSON (JavaScript Objection Notation) is an open standard widely used to structure payloads for data interchange by arranging contents in name-value pairs and arrays.

For particular applications, a schema may be established and published as part of an API, for describing the structure that every structured payload is required to adopt in order to be accepted and/or properly handled by the corresponding software component. Such a schema may establish that a given structured payload must have particular data elements entered into particularly-named fields. For example, a given schema for a user profile structured payload where (for example) a new user is being added as a subscriber to a social media site, may establish that the payload must have a firstName field, a lastName field, a dateOfBirth field, and a contactEmail field, along with corresponding valid values.

The size of a structured payload, in kiloBytes (kB) for example, is technically relevant to the transmission, intake, and processing of the electronic message containing them. For example, larger structured payloads will require more storage capacity to store (either alone or as part of the electronic message, on both transmitting and receiving ends), more network bandwidth to transmit, and more processing capacity to process on the receiving end, than smaller structured payloads. It is of course well-known that different structured payloads that may be considered for submission to even the same API can typically be of different sizes due solely to differences in the sizes of the values their fields contain. For example, lastName field with a corresponding value of "Lee" in one structured payload will require fewer kB (kiloBytes) to store than will a lastName field with a corresponding value of "Boghossian", due simply to the difference in number of letters in these last names. Despite payload size disparities of these kinds being somewhat unavoidable, it is the case that—particularly but not exclusively for systems requiring handling of large volumes of electronic messages to be stored, transmitted, received, stored, and processed—implementations that take into account the actual structures of structured payloads, with a view to ensuring each structured payload has the kinds of data it needs but is no larger than it needs to be, remain of particular interest.

Where considerations as to payload size is concerned, it has been observed that, in some applications, more or fewer kinds of information may be required of a given structured payload, dependent on the very value of the information the payload includes. That is, it may be the case that, if a particular field of a particular structured payload has a particular corresponding value, the structured payload needs also to include some other field, but otherwise does not need it. For example, the application logic may require that, if a structured payload for a user profile for a new member of a social media site, for a Country field, has a corresponding value of "United States of America", the structured payload must also include a State field with corresponding value (such as "West Virginia"), but otherwise does not need the State field. In this way, a structured payload with a Country field corresponding value of "Canada" but with no State field can be just as useful to the application logic but can smaller in size than a structured payload counterpart that, due to the counterpart containing "United States of America" in the Country field, must additionally contain the additional field State and a corresponding value for it.

A given schema, such as a JSON schema, may simply specify which fields are required according to the schema, and leave it to application code to decide that, for one structured payload a given field is entirely extraneous and for another structured payload the given field and its corresponding value are useful. This would tend to result in a system storing, transmitting, and processing payloads that are roughly all the same size (with variations being only due to the size of the data, not the number of fields), with some structured payloads being only as large as they need to be and possibly many more other structured payloads being larger than they need to be. However, such a JSON schema is not optimized for considerations of system resources such as storage, bandwidth and processing capacity, since it is not the case that each structured payload has the kinds of data it needs but is no larger than it needs to be.

In order to establish a system whereby a given structured payload for a particular application can include more or fewer fields of data, and thus be appropriately larger or smaller in size based on the values of its contents, while also conforming to an overall schema established for the application, various approaches using multiple variants of the same schema are possible. For example, one approach may be to generate an array of multiple different but related schemas (i.e., variants of the same schema) that are similar in certain ways but are different in others, and to prepare software code to select which one of the schema variants should be applied to "judge" a particular structured payload being formed or received at an API based on what fields and/or values the structured payload contains. For example, the application code may operate to select a "United States of America" user profile schema variant, containing the requirement that the structured payload also includes a State field and corresponding value, as applicable, in response to the application code, searching first for a Country field value of "United States of America" in the structured payload itself, having found just that value. Where "United States of America" is not in the Country field, the application code may operate to select the "Other Country" schema variant.

One technical problem with such an approach is simply that the storage requirements for multiple schema variants available to address a given structured payload are greater than for a single schema. Copies of the multiple schema variants need to readily available to each of the software components that may need to apply them, which may require a corresponding scaling up of storage capacity across the entire system as compared to a single schema approach.

It may be the case that such an increase in storage capacity for storing multiple schema variants that are similar in many respects but different in others may not be very costly or difficult to implement, depending on the system and the number of variants required to be stored. However, requiring multiple variants of a schema can give rise to another technical problem arising in the context of schema updates. Over time, the requirements of a particular application may change, such that what is required of a particular structured payload for the particular application may change. Propagation of such requirement changes to all participants in a system may be done, at least in part, by having each participant replace their local copies of schemas with updated copies, but in the case of multiple schema variants, the risk of inaccurate propagation of a particular application logic requirements can increase. For example, if one software component of one system participant is operating according to multiple schema variants in storage that have not all quite been updated in exactly the same manner as those in storage of another software component of another system participant at the time of a transaction, risks of inoperability may be high. This risk rises with the number of such variants such that the risk of one participant not being fully updated increases exponentially as the number of participants increases.

A third technical problem with using multiple schema variants is also related to schema updates, but also to general flexibility of implementation. Where a software component has been "hard coded" with the conditional logic that processes a structure payload to look for particular fields and particular values of fields when choosing which of the multiple schema variants are applicable, changes in the requirements of the application will accordingly require changes to the software code itself. Changes to software code require specialized software development personnel, development scheduling and considerations as to software quality assurance and testing, which can be costly and time consuming, delaying the update process and possibly introducing additional risks of inoperability. Furthermore, differently-operated systems may required different personnel, procedures and standards for implementing software changes for updates.

It is an object of an aspect of the present description to provide a technical solution to restructuring structured payloads to both conform to a schema and be appropriately structured for efficient downstream electronic storage, transmission, intake, and processing.

SUMMARY

According to examples, an enhanced schema that specifies the required structure of a structured payload may be provided with one or more fields specified as contingently-required. That is, each field specified as contingently-required in the enhanced schema is required to be present in a structured payload only if a condition, also specified in the enhanced schema itself, is satisfied by current contents of the structured payload. That is, whether a field specified as contingently-required is actually required is contingent on the contents of the structured payload. At least one processor may be configured with processor-readable code to process the enhanced schema and, during the processing (for example, parsing) of the enhanced schema, when encountering a field that is specified as contingently-required, may then obtain the condition from the enhanced schema and process the structured payload itself to determine whether the condition is satisfied by the contents of the structured payload. If the condition is not satisfied by the contents of the structured payload, then the contingently-required field is not currently required in the structured payload. If the condition is indeed satisfied by the contents of the structured payload, the contingently-required field is currently required in the structured payload. In examples, subsequent to resolving in this way which of the contingently-required fields is required and which is not, processing of the structured payload may proceed in order to add any fields that are required and to remove any fields that are not required.

Because the contingencies and conditions are specified in the enhanced schema, the software code processing the enhanced schema only has to be capable of detecting a flag or marker in the enhanced schema itself that specifies a given field is contingently-required (or, to put it another way, is required or not required conditional upon the contents of the structured payload) and what the condition is. The software code prepared to conduct the processing does not itself have to "hard code" any actual conditions, such as particular values or even particular fields, since the fact that a field is conditional, and the condition itself, are specified in the enhanced schema itself. In this way, the software code responsible for processing the enhanced schema and the structured payload needs only be capable of appreciating that a field is conditional, that its condition is associated with the field, and that whether or not that condition is satisfied is to be done by consulting the structured payload itself. The system requires only a single enhanced schema, rather than multiple (non-enhanced) schema variants, as the single enhanced schema can encode such variations as contingently-required fields with corresponding conditions. Still further, by providing a single enhanced schema with contingently-required fields and software code to process both the enhanced schema and the structured payload it is to "judge", the system can process the structured payload to ensure it has all of the data it needs for a downstream system to transmit, store, and process, and that it is no larger than it needs to be—and is thus efficient—for these downstream activities.

It is an aspect of the examples described herein that a structured payload may generally be processed iteratively according to the present description until the structured payload has been sufficiently restructured to both include sufficient data and be no larger than it needs to be. For example, in a first iteration, after evaluation of one or more conditions of contingently-required field(s) of the enhanced schema against the contents of the structured payload, one or more fields with corresponding values may be actually added to the structured payload and one or more fields may be actually removed from the structured payload, thereby to generate a restructured payload. Such a restructured payload may itself have a different size from the (original) structured payload. For example, if the restructured payload has more fields than the structured payload that gave rise to it, then it may be larger but accordingly have been restructured in a direction of having more of the data it needs. If the restructured payload has fewer fields than the structured payload that gave rise to it, then it may be smaller and still have been restructured in a direction of reduced size while retaining the data it needs. Furthermore, at this point the restructured payload may itself be subjected to another iteration of the process whereby, in a second iteration, after evaluation of one or more conditions of contingently-required field(s) of the enhanced schema against the contents of the restructured payload, one or more fields with corresponding values may be actually added to the restructured payload and one or more fields may be actually removed from the restructured payload, thereby to generate a further restructured payload. Such a further restructured payload may itself have a different size from the (original) structured payload and the restructured payload. This process may continue iteratively, until such time as the process determines that, in an nth-restructured payload, there are no missing fields of data and no fields that should be removed, at which point the process can be stopped and the nth-restructured payload can be used for electronic messaging/submission to an API, transmission, storage and the like.

The reason that a given structured payload may need multiple iterations of restructuring, according to the present application, is that a field added to the structured payload in a previous iteration to generate a restructured payload may itself have a corresponding value that satisfies another condition specified in the enhanced schema in association with another field. That condition would not have been regarded as satisfied in the previous iteration because the field to which it pertains was not even present during the previous iteration; it had only just been added as a result of the previous iteration's processing. In the current iteration, with that field having been previously added along with a corresponding value, another contingently-required field specified in the enhanced schema but not previously added may have an applicable condition which, once evaluated during the current iteration, is determined to have been satisfied by the contents of the previously-restructured structured payload. Thus, in a current iteration, the structured payload may be further restructured to include that field and a corresponding value.

One aspect described herein is a computer system for restructuring a structured payload. In an example, the computer system comprises processor-readable memory storing: a schema, wherein the schema specifies fields including at least one contingently-required field; and the structured payload; and at least one processor configured to: retrieve the schema and the structured payload from the processor-readable memory; evaluate, for each contingently-required field in the schema, whether a respective condition in the schema is either satisfied or unsatisfied by content in the structured payload; responsive to a respective condition being satisfied, add the contingently-required field to a list of required fields; responsive to a respective condition being unsatisfied, add the contingently-required field to a list of removed fields; and generate a restructured payload by: adding to the structured payload all fields in the list of required fields that are missing; and removing from the structured payload all fields in the list of removed fields that are present.

Another aspect described herein is a computer-implemented method of restructuring a structured payload, wherein a schema for the structured payload specifies fields including at least one contingently-required field. In an example, the method comprises: retrieving the schema and the structured payload from processor-readable memory; evaluating, for each contingently-required field in the schema, whether a respective condition in the schema is either satisfied or unsatisfied by content in the structured payload; responsive to a respective condition being satisfied, adding the contingently-required field to a list of required fields; responsive to a respective condition being unsatisfied, adding the contingently-required field to a list of removed fields; and generating a restructured payload by: adding to the structured payload all fields in the list of required fields that are missing; and removing from the structured payload all fields in the list of removed fields that are present.

Another aspect described herein is a non-transitory processor-readable medium embodying a computer program that is executable by at least one processor for restructuring a structured payload, wherein a schema for the structured payload specifies fields including at least one contingently-required field. In an example, the computer program comprises: computer program code for retrieving the schema and the structured payload from processor-readable memory; computer program code for evaluating, for each contingently-required field in the schema, whether a respective condition in the schema is either satisfied or unsatisfied by content in the structured payload; computer program code for responsive to a respective condition being satisfied, adding the contingently-required field to a list of required fields; computer program code for responsive to a respective condition being unsatisfied, adding the contingently-required field to a list of removed fields; and computer program code for generating a restructured payload including: computer program code for adding to the structured payload all fields in the list of required fields that are missing; and computer program code for removing from the structured payload all fields in the list of removed fields that are present.

Examples described herein offer a number of technical benefits. For example, removal of unrequired fields from a structured payload reduces the size of the payload being stored, transmitted, and processed downstream. Similarly, addition of required fields to the structured payload may increase the size of the structured payload being stored, transmitted, taken in, and processed, but ensures the structured payload has the content it needs for the application. A combination of adding and removing of fields in an iterative manner moves the structured payload towards right-sizing, which provides a structured payload for use downstream that has the contents it needs, but is no larger than it needs to be.

By providing, in this iterative manner, the structured payload with the content its needs according to the enhanced schema while being no larger than it needs to be, downstream processing of the restructured payload can be conducted at a lower error rate. For example, by providing a process that can restructure structured payloads, conformance with the enhanced schema—even with its conditions—can be conducted in advance of downstream storage, transmission and processing such that error-detection by an API of another system component can be significantly reduced. Because error detection can be significantly reduced due to the prior restructuring, the number of additional electronic transmissions—with all of their own storage and processing requirements—through a network solely with the purpose of requesting a corrected payload from the initial requestor, can be significantly reduced or eliminated. That is, the systems and processes described herein can be employed to initially automatically check, bolster (if needed), and right-size (if needed) a structured payload against an enhanced schema, prior to any transmission for, and submission to, a downstream API that is expecting payloads that conform to the schema. As such, the present systems and processes may be used by each component of the overall system that is expected to prepare and submit structured payloads according to an enhanced schema, to cause the enhanced schema and the structured payload to work on each other over one, two, or more iterations (depending, as described, on the contents of the schema and on the contents of the structured and restructured payloads as they take shape) until such time as conformance to the enhanced schema can be confirmed. This iterative process, done locally, can be very efficient compared with a process whereby checking a structured payload against the schema is expected to be solely done by the ingesting API, after transmission to and processing by the ingesting API.

Furthermore, by enabling conditions to be encoded in the schema itself, the hardcoding of conditions in software, requiring specialist programming for initial implementation and upgrades, can be avoided.

Other technical advantages may accrue from a system that includes an enhanced schema specifying contingently-required fields, processing capabilities for processing the enhanced schema, and processing capabilities for processing a structured payload to both evaluate whether conditions of such contingently-required fields are satisfied by structured payload contents and to add/remove such contingently-required fields to/from the structured payload itself based on whether the conditions are satisfied and whether such fields are missing from/present in the structured payload.

Examples described herein may be implemented in various applications. For example, insurance company APIs need to gather various pieces of information for assessing insurance quotes, based on the type of insurance being requested and the nature of the business requesting insurance, in order to calculate a premium. The body of an insurance quote API request can therefore be very dynamic. In order to specify what information resources are conditionally required, a schema specifying the quote request body—the structured payload in such a case—may itself specify conditional fields and the conditions under which they are required, in order to reflect the business rules underlying the quotation process.

BRIEF DESCRIPTION OF THE DRAWINGS

FIGS. 1A and 1B are two portions of a web application user interface that demonstrates how to compute a dynamic request payload for a quotation API, according to an example.

Other aspects and embodiments will become apparent upon reading the following description.

DETAILED DESCRIPTION OF EXAMPLES

In this description, a structured document such as an XML document that is to be used as a payload for an API or other ingesting system may be regarded as a structured payload, such that adding or removing fields from the structured document according to the methods and systems described herein to generate a restructured document, may be regarded for purposes herein as restructuring a structured payload. An example of such a structured document may be a JSON document. It will be appreciated that the specification of the current JSON schema, which may be found at https://json-schema.org/draft/2020-12/json-schema-core, does not contemplate expressing that a JSON document should not include a resource (i.e., field) B if the JSON document has a resource A. As such, the current JSON schema specification is not capable of being used to restructure a JSON document to remove such a resource B from a JSON document when the JSON document includes the resource A. Furthermore, the current JSON schema specification is not capable of being used to undertake an iterative process during which contents of a JSON document itself can inform which aspects of a JSON schema are to be brought to bear on the question as to whether the JSON document conforms to the JSON schema. In the present description, an iterative process is conducted so that the JSON document can inform which aspects of the enhanced JSON schema are to be brought to bear on the question as to whether the JSON document conforms to the enhanced JSON schema such that, if during a particular iteration it does not, the JSON document can be restructured to add or remove resource(s) and can, in a next iteration, as a restructured JSON document, again inform which aspects of the enhanced JSON schema (possibly different aspects than a previous iteration) are to be brought to bear on the question as to whether the restructured JSON document conforms to the enhanced JSON schema.

In this description, a novel data structure that may be included in a JSON schema, thereby to enhance the JSON schema, is provided. The data structure is formatted to express the availability of a field in a JSON document based on the presence of and/or values of other fields in the same JSON document. This data structure can be placed under any custom keywords for structural validation in the enhanced JSON schema. This data structure may contain logical and mathematical conditions and compositions of conditions, such that each contingently-required field in the schema can be specified to be required, or not, in the JSON document in the event that an evaluation as to whether the condition(s) and/or compositions thereof are satisfied or unsatisfied by content in the JSON document (or, in a subsequent iteration, of content of the since-restructured JSON document, and so forth).

Operands in these conditions can be literals, references to resources in the JSON document, and/or formulas. The data structure in the enhanced JSON schema is operated on by a computer system to process any JSON document based on a given enhanced JSON schema extended with this data structure to automatically add missing fields to, and remove unnecessary fields from, the JSON document (or, in a subsequent iteration, of content of the since-restructured JSON document, and so forth).

An example enhanced JSON schema, containing the novel data structure according to the present application, is shown below. This JSON schema, along with a JSON document, may be retrieved from processor-readable memory for processing by one or more processor of a computer system as described herein.

Enhanced JSON Schema:
```
{
"type": "object",
"properties": {
    "ProductType": {
        "type": "string",
        "enum": [
            "BusinessOwnerPolicy",
            "GeneralLiability",
            "ProfessionalLiability"
        ]
    },
    "RatingInfo": {
        "type": "object",
        "properties": {
            "BusinessInfo": {
                "type": "object",
                "properties": {
                    "BusinessName": {
                        "type": "string"
                    },
                    "Revenue": {
                        "type": "number"
                    },
                    "PrimaryAddress": {
                        "type": "object",
                        "properties": {
                            "Address": {
                                "type": "string"
                            },
                            "City": {
                                "type": "string"
                            },
                            "State": {
                                "type": "string"
                            },
                            "County": {
                                "type": "string"
                            },
                            "Zip": {
                                "type": "string"
                            }
                        },
                        "required": [
                            "Address",
                            "City",
                            "State",
                            "Zip"
                        ]
                    },
                    "AdditionalAddresses": {
                        "type": "array",
                        "items": {
                            "type": "object",
                            "properties": {
                                "Address": {
                                    "type": "string"
                                },
                                "City": {
                                    "type": "string"
                                },
                                "State": {
                                    "type": "string"
                                },
                                "County": {
                                    "type": "string"
                                },
                                "Zip": {
                                    "type": "string"
                                }
                            },
                            "required": [
                                "Address",
                                "City",
                                "State",
                                "Zip"
                            ]
                        }
                    },
                    "additionalProperties": false,
                    "required": [
                        "BusinessName"
                    ]
                },
                "BOPRatingInfo": {
                    "type": "object",
                    "properties": {
                        "BuildingFootage": {
                            "type": "integer",
                            "x-condition": [
                                "= =",
                                "$ProductType",
                                "BusinessOwnerPolicy"
                            ]
                        },
                        "RoofMaterial": {
                            "type": "string",
                            "enum": [
                                "asphalt",
                                "wood",
                                "metal",
                                "rubber",
                                "slate"
                            ],
                            "x-condition": [
                                ">=",
                                "$RatingInfo.BopRatingInfo.BuildingFootage", 1000
                            ]
                        },
                        "Utility": {
                            "type": "array",
                            "uniqueItems": true,
                            "items": {
                                "type": "string",
                                "enum": [
                                    "water",
                                    "sewer",
                                    "electricity",
                                    "gas"
                                ]
                            }
                        },
                        "AddBuildingCoverageToAllLocations": {
                            "type": "boolean",
                            "x-condition": [
                                "PRESENT",
                                "$RatingInfo.BusinessInfo.AdditionalAddresses[0].State"
                            ]
                        }
                    },
                    "additionalProperties": false,
                    "required": [
                        "BuildingFootage"
                    ]
                }
            },
            "additionalProperties": false,
            "required": [
                "BusinessInfo"
            ]
        }
    },
    "additionalProperties": false,
    "required": [
        "ProductType",
        "RatingInfo"
    ]
}
```

In the example enhanced JSON schema given above, a custom keyword of "x-condition" is used to indicate that a field is a contingently-required field. In this way, the computer system is able to parse through the JSON schema to identify, by recognition of the "x-condition" keyword, which fields are contingently-required in the subject JSON document, as well as to extract the condition for each of the fields that are contingently-required so that the condition can be evaluated against the content of the subject JSON document (or, in a subsequent iteration, the restructured JSON document). In this particular example, there are three JSON fields identified as "x-condition" fields. These are: BuildingFootage, RoofMaterial, and AddbuildingCoverageToAllLocations.

It will be appreciated that, without accounting for those fields specified as "x-condition" fields (i.e., contingently-required fields), the following JSON document would be legitimate to (i.e. would conform to) the above-given JSON schema:

```
JSON document:
{
   "ProductType": "BusinessOwnerPolicy",
   "RatingInfo": {
      "BusinessInfo": {
         "BusinessName": "Awesome Business"
      }
   }
}
```

However, taking into account the contingently-required fields—those fields marked as "x-condition" fields in the enhanced JSON schema, it can be seen that the condition in the BuildingFootage field reflects a business requirement that requires the JSON document to include a BuildingFootage field only when the ProductType field of the JSON document has a value of BusinessOwnerPolicy. The subsection of the BuildingFootage field in the enhanced JSON schema that specifies this condition is reproduced below:

```
...
"x-condition": [
   "= =",
   "$ProductType",
   "BusinessOwnerPolicy"
]
...
```

It will be appreciated that, in this subsection, "==" is the operator, and $Product Type beginning with $ indicates that this portion is referencing the field ProductType in the JSON document. BusinessOwnerPolicy is the value being compared. Therefore, this subsection is specifying a business requirement that a BuildingFootage field is required in the JSON document in the event that the ProductType field in the same JSON document is equal to BusinessOwnerPolicy. This particular condition is a codification of a business requirement—that of an API for providing an insurance quote requiring a JSON document payload, when seeking the quote via the API, to include building footage information if the product type being quoted is a business owner policy. The codification with conditions provides a form of structured payload that can be processed and acted upon by the computer system, whether for restructuring, or to confirm conformance with the enhanced schema.

In this case, taking into account this contingently-required BuildingFootage field, and determining that the JSON document provided above has a ProductType field with a BusinessOwnerPolicy value (thus satisfying the condition for the BuildingFootage field), the computer system adds the BuildingFootage field to a list of required fields. The list may be structured as an array or other list useful to the computer system for keeping track of those contingently-required fields that have been determined in the current iteration, by their condition being satisfied, to be required in the JSON document. The JSON document may then be processed to determine whether it already has a BuildingFootage field. In this example, it does not have a BuildingFootage field, so the computer system may restructure the JSON document to add the BuildingFootage field. This may be done by presenting a request to a user, via a user interface, to provide a value for a BuildingFootage field, such as a square footage value, and then inserting the BuildingFootage field and the value into the JSON document thereby to restructure the JSON document. Alternatively or in some combination, depending on the implementation, this may be done by requesting the building footage number from another application via an API or parsing another document for the information, and receiving the building footage from the API or other document for insertion as part of the BuildingFootage field into the JSON document thereby to restructure the JSON document. Such a restructured JSON document—the JSON document now with a BuildingFootage field and corresponding value—may be as follows:

```
Restructured JSON document:
{
   "ProductType": "ProfessionalLiability",
   "RatingInfo": {
      "BusinessInfo": {
         "BusinessName": "Awesome Business"
      },
      "BOPRatingInfo": {
         "BuildingFootage": 0
      }
   }
}
```

As can also be seen in the enhanced JSON schema above, the RoofMaterial field is also a contingently-required field. The condition for requiring a RoofMaterial field is when the JSON document's BuildingFootage field has a value of 1000 or greater. The relevant subsection of the JSON schema is reproduced below:

```
...
"x-condition": [
   ">=",
   "$RatingInfo.BopRatingInfo.BuildingFootage", 1000
]
...
```

Additionally, however, because RoofMaterial is not in the required array in the enhanced JSON schema, RoofMaterial has the status of an optional resource. $RatingInfo.BopRatingInfo.BuildingFootage is an example of referencing nested resources in the JSON document where resource paths are connected with a "." delimiter.

In this example, the BuildingFootage field that has been added to the JSON document to restructure it as a consequence of the ProductType field being BusinessOwnerPolicy, has been given a value during restructuring that is 0, which is less than 1000. Therefore, the computer system processing the restructured JSON document can determine that the condition for the RoofMaterial field is not itself satisfied, and can adds the RoofMaterial field to a list of removed fields for use during further restructuring of the restructured JSON document. If the restructured JSON document were to have included a RoofMaterial field, the computer system would remove it during further restructuring thereby reducing the size of the resulting JSON document for downstream storage, transmission and processing. In this example, the restructured JSON document set forth above does not include a RoofMaterial field, so no removal is required. On the other hand, if the BuildingFootage field added to the JSON document as a consequence of the ProductType field being BusinessOwnerPolicy were to have been given a value that was 1000 or more, the computer system processing the restructured JSON document could add the RoofMaterial field and a corresponding value, in a similar manner to the adding of the BuildingFootage field and corresponding value explained above.

In this example of the enhanced JSON schema, the AddBuildingCoverageToAllLocations field has an "x-condition" status and thus is also a contingently-required field. The operator "PRESENT" indicates that as long as the State field in the first element of the AdditionalAddresses field of the JSON document has a legitimate value, the AddingBuildingCoverageToAllLocations field (a Boolean type field) can be included in the required field list and thus added during restructuring. This example illustrates how to access an array element in the schema for assessing whether contents of the JSON document satisfy the condition of a contingently-required field.

Non-contingently-required fields—that is, mandatory fields—may be included in the list of required fields. However, in each subsequent iteration, prior to evaluation of the just-restructured document against the schema, all contingently-required fields may be removed from the list of required fields, and all contingently-required fields may be removed from the list of removed fields. In this way, evaluation as to which fields are required or should be removed can be done afresh against a just-restructured document, during each subsequent iteration, as in a subsequent iteration a particular contingently-required field whose condition was not satisfied in a previous iteration may have its condition satisfied, and thus be added to the required fields list. Also, in a subsequent iteration a particular contingently-required field whose condition was satisfied in a previous iteration may have its condition no longer satisfied, and thus be added to the removed fields list. Circular conditions in the business requirements would be avoided so that the codification of same in the enhanced schema could avoid endless loops or adding then removing.

It can be seen that, by providing a mechanism by which contingently-required fields and their conditions can be specified, the single JSON schema can impose constraints on fields of a JSON document based on the presence and/or value of other fields in the JSON document, and thus can enable the computer system to iteratively add or remove certain fields such that the JSON document has all of the information it needs, but is only as big as it needs to be. Such a JSON document can be useful as an efficient structured payload for storage, transmission, and processing in connection with an API, such as for providing only necessary information for obtaining an insurance quote from an insurance provider API, or for seeking any other kind of information from an API or other ingesting participant, or causing downstream events to be efficiently set in motion, in an overall computer system.

In other examples, various formats of conditions can be specified. For example, A condition can be a comparison expression or a logical expression. A comparison expression may consist of three parts:
 Operator, such as ==, !=, >=, <=, <, IN.
 Operand, referencing a resource (i.e. field) in the JSON document or a literal value.
 Another operand.

A logical expression for the condition may begin with a logical operator AND, OR, or NOT, followed by a list of conditions or compositions of conditions. A value for a condition may be a text value, a numerical value and the condition may be a relation (based on the operator) of the value in the JSON document with the value in the schema or with another value in a given field of the JSON document itself.

It is contemplated than an enhanced schema may specify contingently-optional fields, such that a field specified as contingently optional (for example, using something like an "optional-condition" marker) may be added to a list of optional fields in the event its condition is satisfied by contents in the JSON document, and added to the list of removed fields if its condition is not satisfied. Restructuring of the JSON document may proceed by offering the option, to a user for example, to include an optional field in the list of optional fields and a corresponding value, and to remove any contingently-optional fields from the JSON document. If the user should not provide a value for a corresponding optional field, restructuring may not involve including the optional field.

An application of the systems and methods herein may be in the field of insurance. For example, in order to write a premium, an insurance company API must collect various pieces of information based on the type of insurance and the nature of the business. Therefore, the body of an insurance quote API request is very dynamic. In order to express what information resources are conditionally needed, the schema for the quote request body—the structured payload—can be enhanced using the systems and methods described herein with the business rules the particular insurance company requires adherence to when seeking a quote via their insurance company API. When the enhanced schema is used to process a given structured payload as described herein, in particular to restructure the structured payload once or multiple iterations as the business requirements embedded in the schema unfold iteration after iteration based on the restructuring of the payload itself, the structured payload may be made to conform to sophisticated, dependent, and contingent business requirements embedded in the schema before the structured payload is stored, transmitted downstream to the insurance company API, and otherwise processed. Because the structured payload has been assured of all the information it needs but is no bigger than it needs to be, storage, transmission and processing can be efficient, and downstream errors and error messaging can be reduced, minimized, or even eliminated in some cases. As such, the overall computer system can operate more efficiently to produce results for its participants.

Figure 1B:
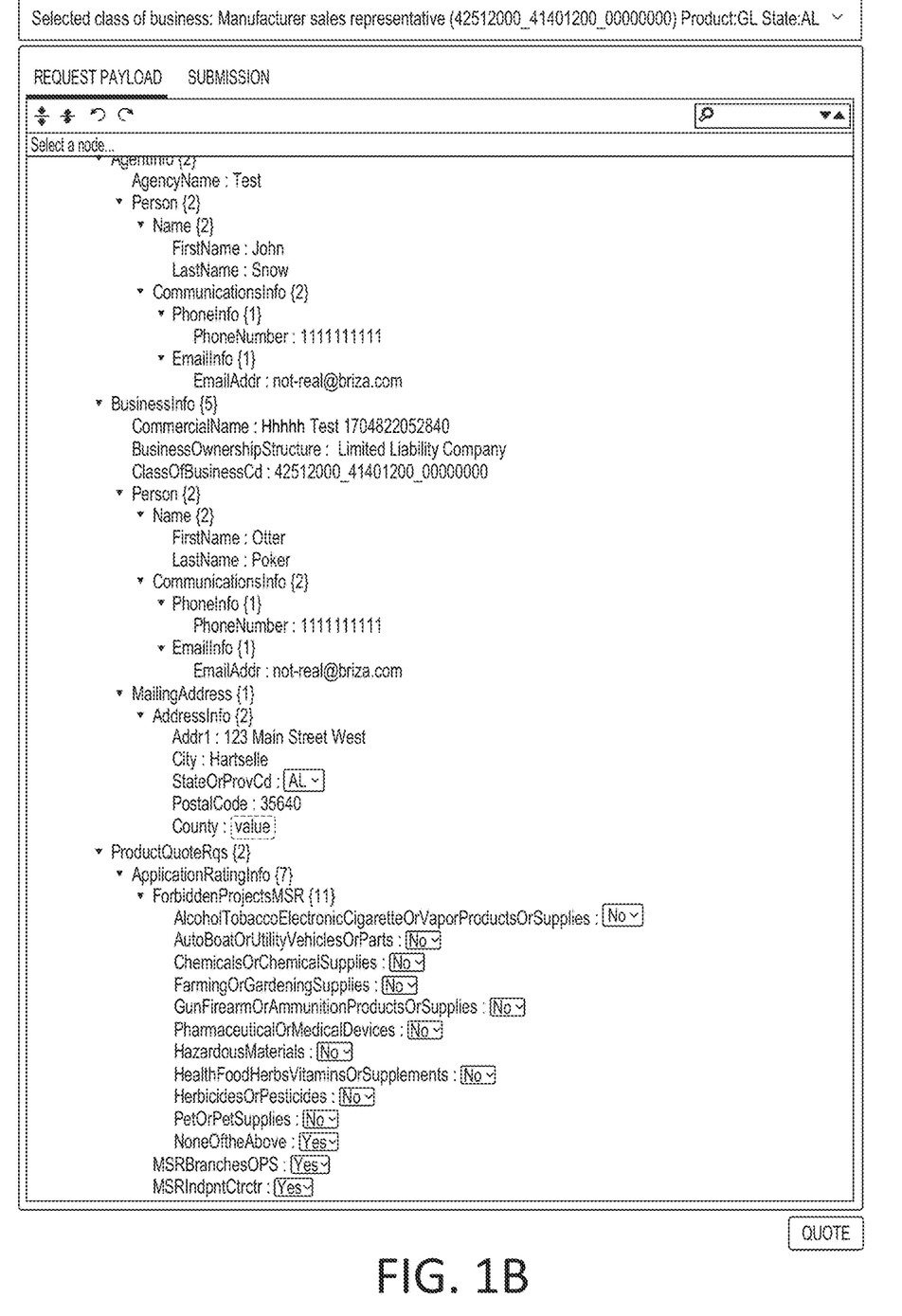

FIGS. 1A and 1B are two portions of a web application user interface that demonstrates how to compute a dynamic request payload for an insurance quotation API, according to an example. An enhanced JSON schema—that which is extended with conditions—is on the left side. The ClassOfBusinessCd is selected on the top right, as its value can also be seen in the request payload on the bottom right. The nested JSON object on the field ForbiddenProjectsMSR in the request payload is present, because ClassOfBusinessCD is set to a value of 42512000_41401200_00000000. After the user chooses values for all conditional fields, the web application re-processes the JSON document and the JSON schema together in order to generate a list of additional fields that are required, and to remove any fields that-due to the values of or presence of existing fields—are not required. After multiple iterations, the request payload for the insurance quotation API includes all required and accurate data, but is no bigger than it needs to be.

Other applications both within the insurance field and in other fields, may benefit from the systems and methods described herein.

Figure 2:
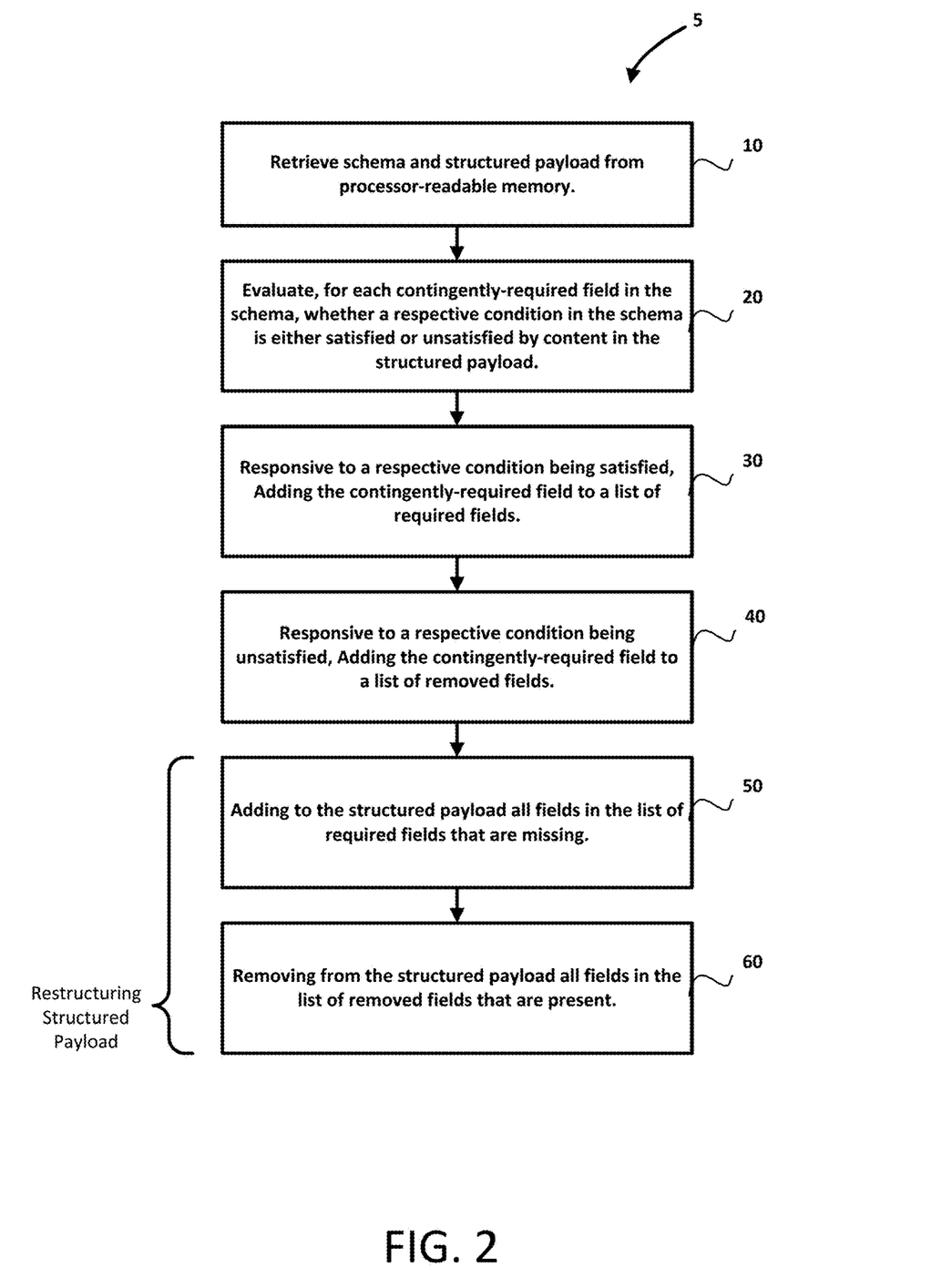
FIG. 2 is a flowchart of a computer-implemented method of restructuring a structured payload, according to an example.

FIG. 2 is a flowchart of a computer-implemented method 5 of restructuring a structured payload, according to an example. In method 5, a schema for the structured payload specifies fields including at least one contingently-required field. Method 5 begins by retrieving the schema and the structured payload from processor-readable memory (step 10). The method proceeds to evaluate, for each contingently-required field in the schema, whether a respective condition in the schema is either satisfied or unsatisfied by content in the structured payload (step 20). Responsive to a respective condition being satisfied, the contingently-required field is added to a list of required fields (step 30). Responsive to a respective condition being unsatisfied, the contingently-required field is added to a list of removed fields (step 40). A restructured payload is generated by: adding to the structured payload all fields in the list of required fields that are missing (step 50) and removing from the structured payload all fields in the list of removed fields that are present (step 60).

Figure 3:
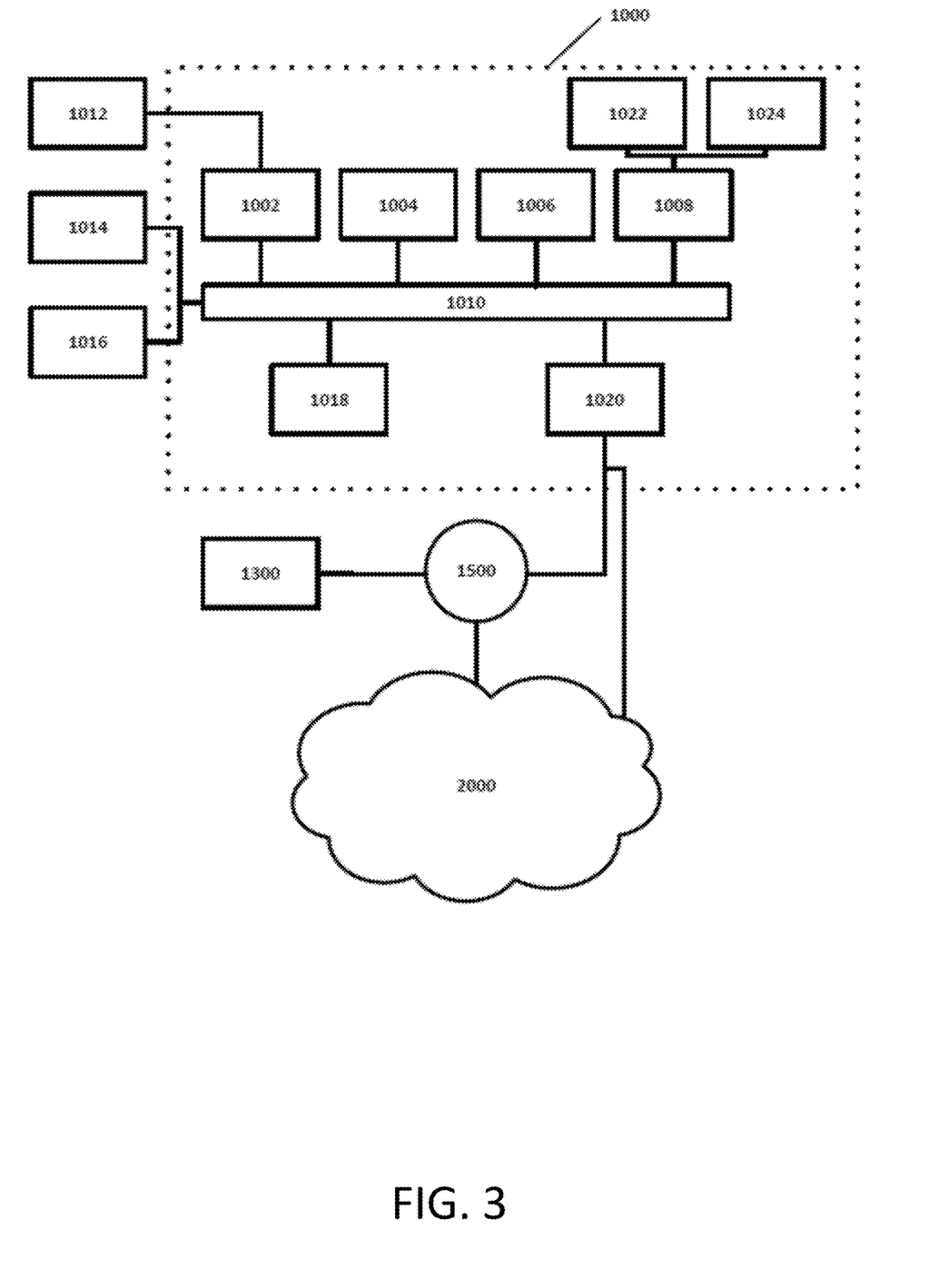
FIG. 3 is a schematic diagram showing a hardware architecture of a computing system.

FIG. 3 is a schematic diagram showing a hardware architecture of a computing system 1000. Computing system 1000 is suitable as the hardware platform for a device such as a server, desktop computer, laptop computer, tablet, smartphone, or other computing device that, in embodiments, process schemas and payloads such as JSON schemas and JSON documents to produce restructured payloads suitable for efficient downstream storage, transmission, and processing.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In embodiments, display controller 1002 incorporates a dedicated graphics-processing unit (GPU) for processing mainly graphics-intensive or other parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application-programming interface (API) such as OpenGL, Direct3D and the like.

Computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, other kinds of input devices such as radar/sonar, front and/or rear cameras, infrared sensors, ultrasonic sensors, LiDAR (Light Detection and Ranging) sensors, and other kinds of sensors.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, computing system 1000 includes at least one processor readable medium or memory for holding instructions programmed according to the teachings of the description and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user. Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), object-oriented programming (OOP) modules such as classes, and complete executable programs. Moreover, parts of the processing of the present description may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present description remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetric digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different from baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing systems may be used to implement the systems and processes described herein.

Electronic data stores implemented in the database described herein may be one or more of a table, an array, a database, a structured data file, an XML file, or some other functional data store, such as hard disk 1022 or removable media 1024.

Although embodiments have been described, those of skill in the art will appreciate that variations and modifications may be made without departing from the spirit, scope and purpose of the invention as defined by the appended claims.

Various further combinations of aspects disclosed herein are possible as examples, such as the examples set forth in the combinations of multiple clauses below.

CLAUSES

Clause 1. A computer system for restructuring a structured payload, the computer system comprising:
processor-readable memory storing:
a schema, wherein the schema specifies fields including at least one contingently-required field; and
the structured payload;
and
at least one processor configured to:
retrieve the schema and the structured payload from the processor-readable memory;

evaluate, for each contingently-required field in the schema, whether a respective condition in the schema is either satisfied or unsatisfied by content in the structured payload;

responsive to a respective condition being satisfied, add the contingently-required field to a list of required fields;

responsive to a respective condition being unsatisfied, add the contingently-required field to a list of removed fields; and generate a restructured payload by:

adding to the structured payload all fields in the list of required fields that are missing; and removing from the structured payload all fields in the list of removed fields that are present.

Clause 2. The computer system of clause 1, wherein the at least one processor is configured to:

remove all contingently-required fields from the list of required fields;

remove all contingently-required fields from the list of removed fields;

evaluate, for each contingently-required field in the schema, whether the respective condition in the schema is either satisfied or unsatisfied by content in the restructured payload;

responsive to a respective condition being satisfied, add the contingently-required field to the list of required fields;

responsive to a respective condition being unsatisfied, add the contingently-required field to the list of removed fields; and generate a further restructured payload by:

adding to the restructured payload all fields in the list of required fields that are missing; and removing from the restructured payload all fields in the list of removed fields that are present.

Clause 3. The computer system of clause 1, wherein one or more respective condition comprises:

a predetermined other field being present in the structured payload.

Clause 4. The computer system of clause 1, wherein one or more respective condition comprises:

a value of a predetermined other field in the structured payload satisfying a value condition.

Clause 5. The computer system of clause 1, wherein adding to the structured payload all fields in the list of required fields that are missing comprises:

requesting, in respect of each field in the list of required fields that is missing, a corresponding value;

receiving each corresponding value; and inserting, into the structured payload, each field in the list of required fields that is missing along with the corresponding value.

Clause 6. The computer system of clause 5, wherein the requesting and receiving are conducted of and from a user via a user interface.

Clause 7. The computer system of clause 5, wherein the requesting and receiving are conducted of and from an application via an application programming interface (API).

Clause 8. The computer system of clause 1, wherein the at least one processor is configured to:

add all non-contingently-required fields specified in the schema to the list of required fields.

Clause 9. A computer-implemented method of restructuring a structured payload, wherein a schema for the structured payload specifies fields including at least one contingently-required field, the method comprising:

retrieving the schema and the structured payload from processor-readable memory;

evaluating, for each contingently-required field in the schema, whether a respective condition in the schema is either satisfied or unsatisfied by content in the structured payload;

responsive to a respective condition being satisfied, adding the contingently-required field to a list of required fields;

responsive to a respective condition being unsatisfied, adding the contingently-required field to a list of removed fields; and generating a restructured payload by:

adding to the structured payload all fields in the list of required fields that are missing; and removing from the structured payload all fields in the list of removed fields that are present.

Clause 10. The computer-implemented method of clause 9, further comprising:

removing all contingently-required fields from the list of required fields;

removing all contingently-required fields from the list of removed fields;

evaluating, for each contingently-required field in the schema, whether the respective condition in the schema is either satisfied or unsatisfied by content in the restructured payload;

responsive to a respective condition being satisfied, adding the contingently-required field to the list of required fields;

responsive to a respective condition being unsatisfied, adding the contingently-required field to the list of removed fields; and generating a further restructured payload by:

adding to the restructured payload all fields in the list of required fields that are missing; and removing from the restructured payload all fields in the list of removed fields that are present.

Clause 11. The computer-implemented method of clause 9, wherein one or more respective condition comprises:

a predetermined other field being present in the structured payload.

Clause 12. The computer-implemented method of clause 9, wherein one or more respective condition comprises:

a value of a predetermined other field in the structured payload satisfying a value condition.

Clause 13. The computer-implemented method of clause 9, wherein adding to the structured payload all fields in the list of required fields that are missing comprises:

requesting, in respect of each field in the list of required fields that is missing, a corresponding value;

receiving each corresponding value; and inserting, into the structured payload, each field in the list of required fields that is missing along with the corresponding value.

Clause 14. The computer-implemented method of clause 13, wherein the requesting and receiving are conducted of and from a user via a user interface.

Clause 15. The computer-implemented method of clause 13, wherein the requesting and receiving are conducted of and from an application via an application programming interface (API).

Clause 16. The computer-implemented method of clause 9, further comprising:

adding all non-contingently-required fields specified in the schema to the list of required fields.

Clause 17. A non-transitory processor-readable medium embodying a computer program that is executable by at least one processor for restructuring a structured payload, wherein a schema for the structured payload specifies fields including at least one contingently-required field, the computer program comprising:
- computer program code for retrieving the schema and the structured payload from processor-readable memory;
- computer program code for evaluating, for each contingently-required field in the schema, whether a respective condition in the schema is either satisfied or unsatisfied by content in the structured payload;
- computer program code for responsive to a respective condition being satisfied, adding the contingently-required field to a list of required fields;
- computer program code for responsive to a respective condition being unsatisfied, adding the contingently-required field to a list of removed fields; and
- computer program code for generating a restructured payload including:
- computer program code for adding to the structured payload all fields in the list of required fields that are missing; and
- computer program code for removing from the structured payload all fields in the list of removed fields that are present.

Clause 18. The non-transitory processor-readable medium of clause 17, wherein the computer program further comprises:
- computer program code for removing all contingently-required fields from the list of required fields;
- computer program code for removing all contingently-required fields from the list of removed fields;
- computer program code for evaluating, for each contingently-required field in the schema, whether the respective condition in the schema is either satisfied or unsatisfied by content in the restructured payload;
- computer program code for responsive to a respective condition being satisfied, adding the contingently-required field to the list of required fields;
- computer program code for responsive to a respective condition being unsatisfied, adding the contingently-required field to the list of removed fields; and
- computer program code for generating a further restructured payload including:
- computer program code for adding to the restructured payload all fields in the list of required fields that are missing; and
- computer program code for removing from the restructured payload all fields in the list of removed fields that are present.

Clause 19. The non-transitory processor-readable medium of clause 17, wherein one or more respective condition comprises:
- a predetermined other field being present in the structured payload.

Clause 20. The non-transitory processor-readable medium clause 17, wherein one or more respective condition comprises:
- a value of a predetermined other field in the structured payload satisfying a value condition.

Clause 21. The computer system of clause 4, wherein the value is a numerical value and the value condition is selected from the group consisting of:
- the numerical value of the predetermined other field being greater than a numerical value specified in the schema,
- the numerical value of the predetermined other field being equal to a numerical value specified in the schema,
- the numerical value of the predetermined other field being less than a numerical value specified in the schema,
- the numerical value of the predetermined other field being greater than or equal to a numerical value specified in the schema, and
- the numerical value of the predetermined other field being less than or equal to a numerical value specified in the schema.

Clause 22. The computer system of clause 4, wherein the value is a text value and the value condition is:
- the text value is equivalent to a text value specified in the schema.

Clause 23. The computer system of clause 4, wherein the value is a text value and the value condition is:
- the text value is equivalent to one of a plurality of text value options specified in the schema.

Clause 24. The computer system of clause 1, wherein the schema specifies at least one contingently-optional field, and the at least one processor is further configured to:
- evaluate, for each contingently-optional field in the schema, whether a respective condition in the schema is either satisfied or unsatisfied by content in the structured payload;
- responsive to a respective condition being satisfied, add the contingently-optional field to a list of optional fields;
- responsive to a respective condition being unsatisfied, add the contingently-optional field to the list of removed fields; and
- as part of generating the restructured payload:
- providing an option, in respect of each field in the list of optional fields that is missing, to include a corresponding value;
- receiving, responsive to an option in respect of a field in the list of optional fields that is missing, a corresponding value; and
- inserting, into the structured payload, each field in the list of optional fields for which a corresponding value has been received along with the corresponding value.

Clause 25. The computer-implemented method of clause 12, wherein the value is a numerical value and the value condition is selected from the group consisting of:
- the numerical value of the predetermined other field being greater than a numerical value specified in the schema,
- the numerical value of the predetermined other field being equal to a numerical value specified in the schema,
- the numerical value of the predetermined other field being less than a numerical value specified in the schema,
- the numerical value of the predetermined other field being greater than or equal to a numerical value specified in the schema, and
- the numerical value of the predetermined other field being less than or equal to a numerical value specified in the schema.

Clause 26. The computer-implemented method of clause 12, wherein the value is a text value and the value condition is:
- the text value is equivalent to a text value specified in the schema.

Clause 27. The computer-implemented method of clause 12, wherein the value is a text value and the value condition is:
- the text value is equivalent to one of a plurality of text value options specified in the schema.

Clause 28. The computer-implemented method of clause 9, wherein the schema specifies at least one contingently-optional field, and the method further comprises:

evaluating, for each contingently-optional field in the schema, whether a respective condition in the schema is either satisfied or unsatisfied by content in the structured payload;

responsive to a respective condition being satisfied, adding the contingently-optional field to a list of optional fields;

responsive to a respective condition being unsatisfied, adding the contingently-optional field to the list of removed fields; and as part of generating the restructured payload:

providing an option, in respect of each field in the list of optional fields that is missing, to include a corresponding value;

receiving, responsive to an option in respect of a field in the list of optional fields that is missing, a corresponding value; and inserting, into the structured payload, each field in the list of optional fields for which a corresponding value has been received along with the corresponding value.

Clause 29. The non-transitory processor-readable medium of clause 20, wherein the value is a numerical value and the value condition is selected from the group consisting of:

the numerical value of the predetermined other field being greater than a numerical value specified in the schema, the numerical value of the predetermined other field being equal to a numerical value specified in the schema, the numerical value of the predetermined other field being less than a numerical value specified in the schema, the numerical value of the predetermined other field being greater than or equal to a numerical value specified in the schema, and the numerical value of the predetermined other field being less than or equal to a numerical value specified in the schema.

Clause 30. The non-transitory processor-readable medium of clause 20, wherein the value is a text value and the value condition is:

the text value is equivalent to a text value specified in the schema.

Clause 31. The non-transitory processor-readable medium of clause 20, wherein the value is a text value and the value condition is:

the text value is equivalent to one of a plurality of text value options specified in the schema.

Clause 32. The non-transitory processor-readable medium of clause 17, wherein the schema specifies at least one contingently-optional field, and the computer program further comprises:

processor-readable code for evaluating, for each contingently-optional field in the schema, whether a respective condition in the schema is either satisfied or unsatisfied by content in the structured payload;

processor-readable code for, responsive to a respective condition being satisfied, adding the contingently-optional field to a list of optional fields;

processor-readable code for, responsive to a respective condition being unsatisfied, adding the contingently-optional field to the list of removed fields; and processor-readable code for, as part of generating the restructured payload:

providing an option, in respect of each field in the list of optional fields that is missing, to include a corresponding value;

receiving, responsive to an option in respect of a field in the list of optional fields that is missing, a corresponding value; and inserting, into the structured payload, each field in the list of optional fields for which a corresponding value has been received along with the corresponding value.

What is claimed is:

1. A computer system for restructuring a structured payload, the computer system comprising:

processor-readable memory storing:

a schema, wherein the schema specifies fields including at least one contingently-required field; and the structured payload;

and at least one processor configured to:

retrieve the schema and the structured payload from the processor-readable memory;

evaluate, for each contingently-required field in the schema, whether a respective condition in the schema is either satisfied or unsatisfied by content in the structured payload;

responsive to a respective condition being satisfied, add the contingently-required field to a list of required fields;

responsive to a respective condition being unsatisfied, add the contingently-required field to a list of removed fields; and generate a restructured payload by:

adding to the structured payload all fields in the list of required fields that are missing; and removing from the structured payload all fields in the list of removed fields that are present, wherein the at least one processor is further configured to:

remove all contingently-required fields from the list of required fields;

remove all contingently-required fields from the list of removed fields;

evaluate, for each contingently-required field in the schema, whether the respective condition in the schema is either satisfied or unsatisfied by content in the restructured payload;

responsive to a respective condition being satisfied, add the contingently-required field to the list of required fields;

responsive to a respective condition being unsatisfied, add the contingently required field to the list of removed fields; and generate a further restructured payload by:

adding to the restructured payload all fields in the list of required fields that are missing; and removing from the restructured payload all fields in the list of removed fields that are present.

2. The computer system of claim 1, wherein one or more respective condition comprises:

a predetermined other field being present in the structured payload.

3. The computer system of claim 1, wherein one or more respective condition comprises:

a value of a predetermined other field in the structured payload satisfying a value condition.

4. The computer system of claim 1, wherein adding to the structured payload all fields in the list of required fields that are missing comprises:

requesting, in respect of each field in the list of required
fields that is missing, a corresponding value;
receiving each corresponding value; and
inserting, into the structured payload, each field in the list
of required fields that is missing along with the corresponding value.

5. The computer system of claim 4, wherein the requesting and receiving are conducted of and from a user via a user interface.

6. The computer system of claim 4, wherein the requesting and receiving are conducted of and from an application via an application programming interface (API).

7. The computer system of claim 1, wherein the at least one processor is configured to:
add all non-contingently-required fields specified in the schema to the list of required fields.

8. A computer-implemented method of restructuring a structured payload, wherein a schema for the structured payload specifies fields including at least one contingently-required field, the method comprising:
retrieving the schema and the structured payload from processor-readable memory;
evaluating, for each contingently-required field in the schema, whether a respective condition in the schema is either satisfied or unsatisfied by content in the structured payload;
responsive to a respective condition being satisfied, adding the contingently-required field to a list of required fields;
responsive to a respective condition being unsatisfied, adding the contingently-required field to a list of removed fields; and
generating a restructured payload by:
adding to the structured payload all fields in the list of required fields that are missing; and
removing from the structured payload all fields in the list of removed fields that are present,
wherein the computer-implemented method further comprises:
removing all contingently-required fields from the list of required fields;
removing all contingently-required fields from the list of removed fields;
evaluating, for each contingently-required field in the schema, whether the respective condition in the schema is either satisfied or unsatisfied by content in the restructured payload;
responsive to a respective condition being satisfied, adding the contingently-required field to the list of required fields;
responsive to a respective condition being unsatisfied, adding the contingently-required field to the list of removed fields; and
generating a further restructured payload by:
adding to the restructured payload all fields in the list of required fields that are missing; and
removing from the restructured payload all fields in the list of removed fields that are present.

9. The computer-implemented method of claim 8, wherein one or more respective condition comprises:
a predetermined other field being present in the structured payload.

10. The computer-implemented method of claim 8, wherein one or more respective condition comprises:
a value of a predetermined other field in the structured payload satisfying a value condition.

11. The computer-implemented method of claim 8, wherein adding to the structured payload all fields in the list of required fields that are missing comprises:
requesting, in respect of each field in the list of required fields that is missing, a corresponding value;
receiving each corresponding value; and
inserting, into the structured payload, each field in the list of required fields that is missing along with the corresponding value.

12. The computer-implemented method of claim 11, wherein the requesting and receiving are conducted of and from a user via a user interface.

13. The computer-implemented method of claim 11, wherein the requesting and receiving are conducted of and from an application via an application programming interface (API).

14. The computer-implemented method of claim 8, further comprising:
adding all non-contingently-required fields specified in the schema to the list of required fields.

15. A non-transitory processor-readable medium embodying a computer program that is executable by at least one processor for restructuring a structured payload, wherein a schema for the structured payload specifies fields including at least one contingently-required field, the computer program comprising:
computer program code for retrieving the schema and the structured payload from processor-readable memory;
computer program code for evaluating, for each contingently-required field in the schema, whether a respective condition in the schema is either satisfied or unsatisfied by content in the structured payload;
computer program code for responsive to a respective condition being satisfied, adding the contingently-required field to a list of required fields;
computer program code for responsive to a respective condition being unsatisfied, adding the contingently-required field to a list of removed fields; and
computer program code for generating a restructured payload including:
computer program code for adding to the structured payload all fields in the list of required fields that are missing; and
computer program code for removing from the structured payload all fields in the list of removed fields that are present,
wherein the compute program further comprises:
computer program code for removing all contingently-required fields from the list of required fields;
computer program code for removing all contingently-required fields from the list of removed fields;
computer program code for evaluating, for each contingently-required field in the schema, whether the respective condition in the schema is either satisfied or unsatisfied by content in the restructured payload;
computer program code for responsive to a respective condition being satisfied, adding the contingently required field to the list of required fields;
computer program code for responsive to a respective condition being unsatisfied, adding the contingently-required field to the list of removed fields; and
computer program code for generating a further restructured payload including:
computer program code for adding to the restructured payload all fields in the list of required fields that are missing; and computer program code for removing from the restructured payload all fields in the list of removed fields that are present.

16. The non-transitory processor-readable medium of claim 15, wherein one or more respective condition comprises:
   a predetermined other field being present in the structured payload.

17. The non-transitory processor-readable medium claim 15, wherein one or more respective condition comprises:
   a value of a predetermined other field in the structured payload satisfying a value condition.

\* \* \* \* \*